(12) United States Patent
Taylor

(10) Patent No.: US 11,176,791 B2
(45) Date of Patent: Nov. 16, 2021

(54) SECURITY SYSTEMS AND METHODS FOR CONSUMER PRODUCTS

(71) Applicant: InVue Security Products Inc., Charlotte, NC (US)

(72) Inventor: Gary A. Taylor, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 16/456,640

(22) Filed: Jun. 28, 2019

(65) Prior Publication Data
US 2020/0005611 A1   Jan. 2, 2020

Related U.S. Application Data

(60) Provisional application No. 62/691,169, filed on Jun. 28, 2018.

(51) Int. Cl.
*G08B 13/14* (2006.01)
*H04B 3/56* (2006.01)

(52) U.S. Cl.
CPC ........... *G08B 13/1454* (2013.01); *H04B 3/56* (2013.01)

(58) Field of Classification Search
CPC .............................. G08B 13/1454; H04B 3/56
See application file for complete search history.

(56) References Cited

U.S. PATENT DOCUMENTS

| | | | | |
|---|---|---|---|---|
| 6,104,289 A * | 8/2000 | Rand | ................... | G08B 13/1454 340/568.1 |
| 6,761,579 B2 * | 7/2004 | Fort | ....................... | H02G 11/00 340/568.1 |
| 6,946,961 B2 * | 9/2005 | Frederiksen | ....... | G08B 13/1445 340/548 |
| 7,015,596 B2 * | 3/2006 | Pail | .................... | G08B 13/1409 307/20 |
| 7,209,038 B1 * | 4/2007 | Deconinck | ......... | G08B 13/1409 340/541 |
| 7,724,135 B2 * | 5/2010 | Rapp | ....................... | A47F 7/024 211/119.003 |
| 7,876,212 B2 * | 1/2011 | Jones | ..................... | G08B 25/06 340/12.32 |
| 8,081,074 B2 * | 12/2011 | Marshall | ............ | G08B 13/1409 340/568.2 |
| 8,134,458 B2 | 3/2012 | Lund | | |

(Continued)

*Primary Examiner* — Nay Tun
(74) *Attorney, Agent, or Firm* — InVue Security Products Inc.

(57) ABSTRACT

Embodiments of the present invention are directed to security systems and methods for displaying and protecting consumer products from theft. In one example, a security system includes a sensor configured to be secured to the consumer product and a base configured to removably support the sensor. The security system also includes alarming circuitry and a tether including a pair of conductors electrically connected to the alarming circuitry. The tether is configured to be connected to the sensor, and the base is configured to receive the tether. The pair of conductors is configured to transmit power and electrical signals between the base and the sensor using the pair of conductors, and the alarming circuitry is configured to monitor an electrical signal transmitted by the pair of conductors in order to determine whether the tether has been cut or removed from the sensor.

20 Claims, 6 Drawing Sheets

(56) References Cited

U.S. PATENT DOCUMENTS

| | | | |
|---|---|---|---|
| 8,164,436 B2 | 4/2012 | Baird, III et al. | |
| 8,264,323 B2 | 9/2012 | Chandler, Jr. | |
| 8,427,314 B2 * | 4/2013 | Billiard | G08B 25/002 340/568.1 |
| 8,537,012 B2 * | 9/2013 | Rapp | A47F 7/024 340/568.2 |
| 9,092,960 B2 * | 7/2015 | Wheeler | G08B 13/1445 |
| 9,343,860 B2 * | 5/2016 | Zomchek | H01R 31/005 |
| 9,892,604 B2 * | 2/2018 | Blaser | H04W 4/50 |
| 10,043,356 B2 | 8/2018 | Richardson et al. | |
| 2005/0134458 A1 * | 6/2005 | Leyden | G08B 13/1445 340/568.2 |
| 2006/0001541 A1 * | 1/2006 | Leyden | G08B 13/1445 340/568.2 |
| 2007/0152819 A1 * | 7/2007 | Marszalek | G08B 13/1409 340/568.4 |
| 2007/0194918 A1 * | 8/2007 | Rabinowitz | G08B 13/1454 340/568.2 |
| 2011/0068919 A1 * | 3/2011 | Rapp | A47F 7/024 340/568.2 |
| 2014/0159898 A1 * | 6/2014 | Wheeler | G08B 13/1454 340/568.2 |
| 2014/0266724 A1 * | 9/2014 | Taylor | G08B 13/1445 340/568.3 |
| 2016/0253881 A1 * | 9/2016 | Taylor | G08B 13/1445 340/568.2 |
| 2016/0335860 A1 | 11/2016 | Richardson et al. | |
| 2018/0025596 A1 * | 1/2018 | Henson | G08B 13/1454 340/568.2 |
| 2018/0330587 A1 | 11/2018 | Richardson et al. | |

* cited by examiner

SECURITY SYSTEMS AND METHODS FOR CONSUMER PRODUCTS

CROSS-REFERENCE TO RELATED APPLICATION

This application is a non-provisional of and claims the benefit of priority to U.S. Provisional Application No. 62/691,169, filed on Jun. 28, 2018, the entire contents of which are hereby incorporated by reference.

FIELD OF THE INVENTION

Embodiments of the present invention relate generally to security systems and methods for protecting consumer products from theft.

BACKGROUND OF THE INVENTION

Retailers routinely display articles of merchandise, such as telephones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price, and hence the profit margin, for such merchandise continues to decline. Accordingly, these articles of merchandise need to be secured by a security device that effectively and cost efficiently protects the merchandise from theft.

It is common in the field of retail merchandise security to tether electronic devices to a store fixture to prevent theft, yet still allowing a customer to interact with the device. The retailers and their customers want these tethers to be as unobtrusive as possible, making smaller diameter tethers desirable. One problem with keeping tether size small is the number of conductors needed to convey the required electrical signals. Typically, a plurality of conductors is needed to provide both power, data, security, and other functions. As a result, reducing the number of conductors while maintaining necessary functionality can be challenging.

BRIEF SUMMARY

Embodiments of the present invention are directed towards merchandise security systems and methods for displaying and protecting a consumer product from theft. In one embodiment, a merchandise security system includes a sensor configured to be secured to the consumer product, a base configured to removably support the sensor, and alarming circuitry. The merchandise security system also includes a tether comprising a pair of conductors electrically connected to the alarming circuitry, wherein the tether is configured to be connected to the sensor, and the base is configured to receive the tether. The pair of conductors is configured to transmit power and a plurality of electrical signals between the base and the sensor using the pair of conductors, and the alarming circuitry is configured to monitor at least one of the plurality of electrical signals transmitted by the pair of conductors in order to determine whether the tether has been cut or removed from the sensor.

In another embodiment, a method includes transferring power to a sensor attached to the consumer product and/or to the consumer product with a tether connected to the sensor, the tether having a pair of conductors for transmitting the power. The method further includes transmitting a plurality of electrical signals using the pair of conductors, and monitoring at least one of the plurality of electrical signals in order to determine whether the tether has been cut or disconnected from the sensor.

DETAILED DESCRIPTION OF EMBODIMENTS OF THE INVENTION

Figure 1:
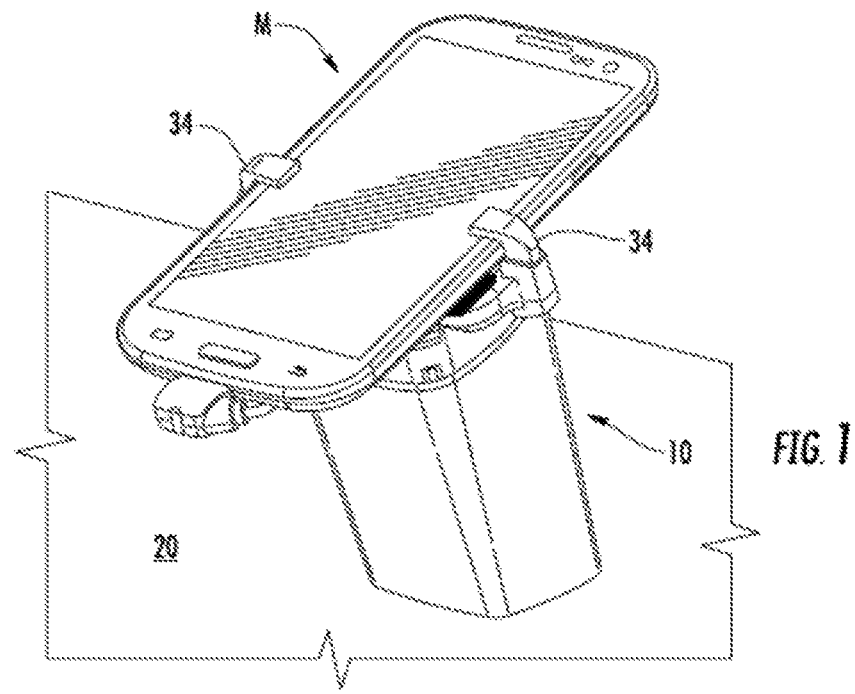
FIG. 1 is a perspective view of a merchandise security system for displaying and protecting an article of merchandise according to an embodiment of the invention.

One or more embodiments of a merchandise security system for protecting consumer products from theft are shown in the accompanying drawing figures and described below. The consumer products, indicated generally herein by reference character M, may be a display model or an operational sample of electronic merchandise or any consumer electronic device, such as portable telephones, smart phones, computers (e.g. notebooks, laptops, tablets, etc.), e-readers, media players, various articles of merchandise, and the like. In some cases, the consumer product M is used in a retail environment for a customer to examine before making a decision whether to purchase the product. The consumer product M may be displayed in a manner that permits a prospective purchaser to evaluate the operation and features of the product, while protecting the product from theft.

Figure 2:
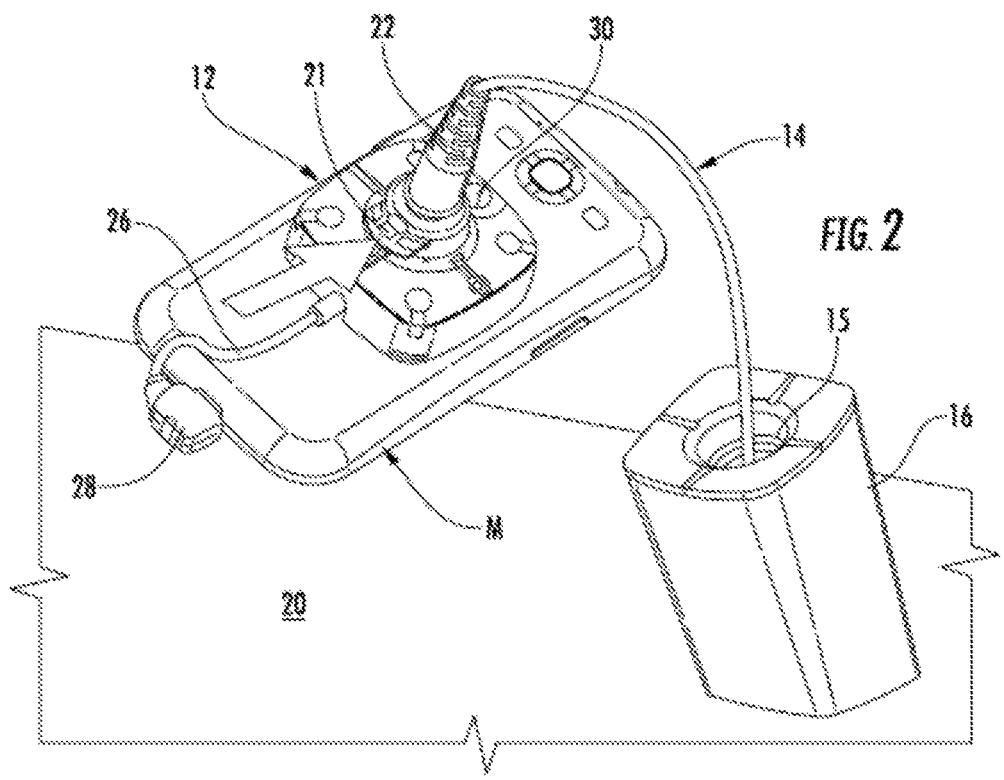
FIG. 2 is a perspective view of another embodiment of a merchandise security system according to the invention shown with the article of merchandise and a sensor attached thereto removed from a base.
Figure 3:
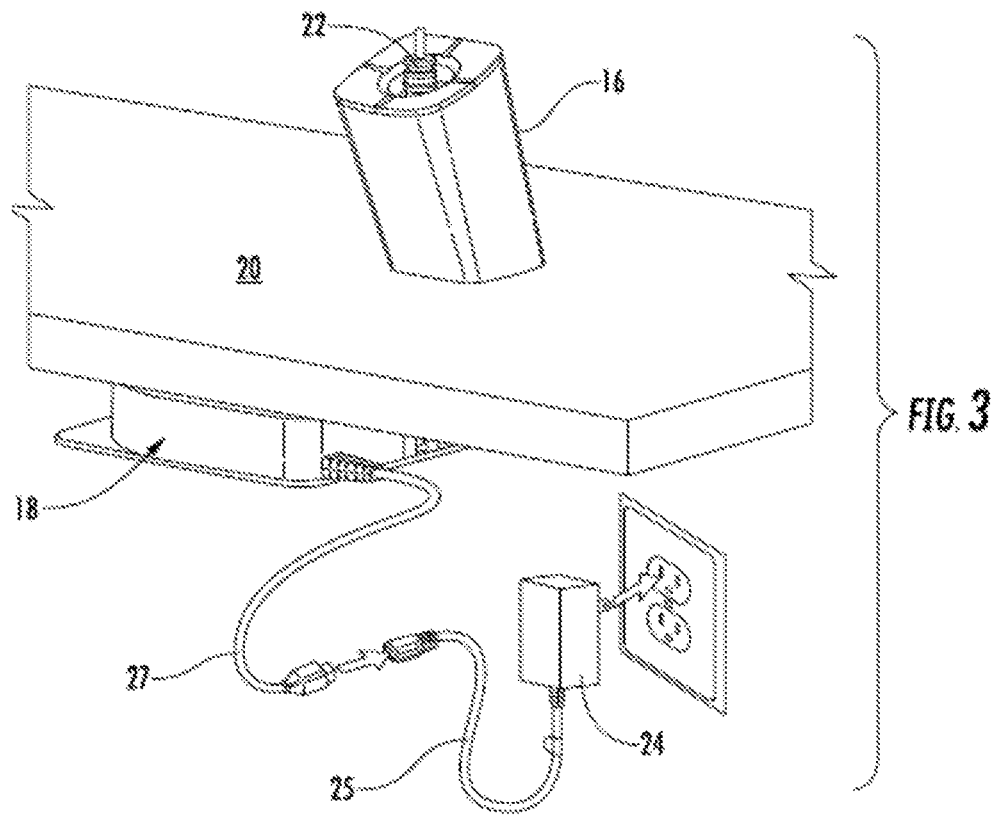
FIG. 3 is a perspective view showing the merchandise security system of FIG. 2 electrically connected to a recoiler secured to a support surface of a display fixture and electrically connected to an external source of power.
Figure 4:
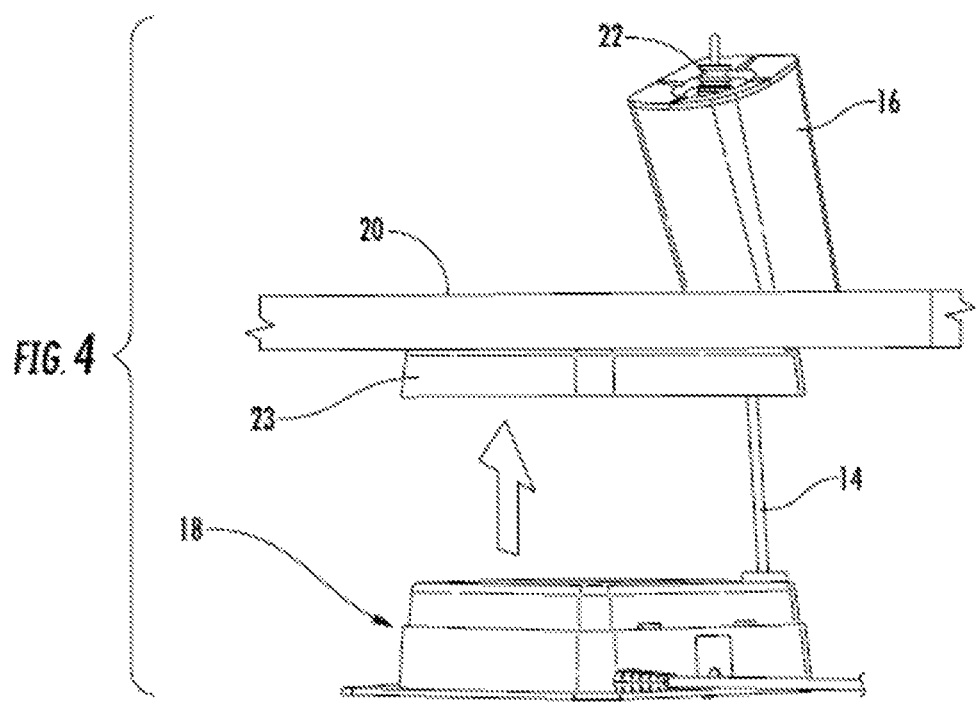
FIG. 4 is a perspective view of the merchandise security system of FIG. 3 showing the recoiler detached from a mounting plate secured to the support surface of the display fixture.
Figure 5:
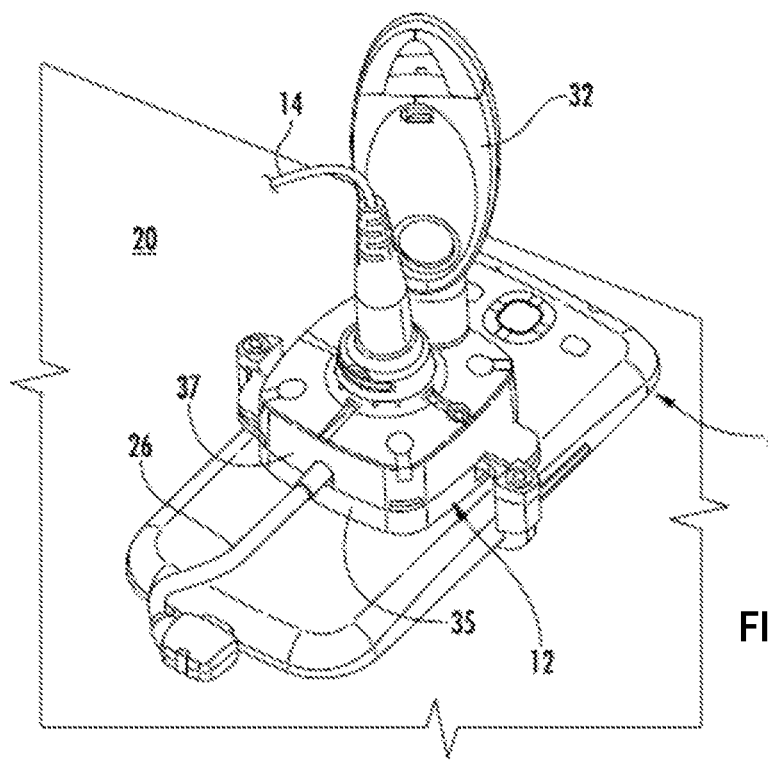
FIG. 5 is a perspective view of a portion of the merchandise security system of FIG. 1 illustrating the use of a key to arm and/or disarm the alarming circuitry of the sensor.

FIGS. 1-5 illustrate embodiments of a merchandise security system 10 for displaying a consumer product M and securing the product from theft or unauthorized removal. The system 10 generally includes a sensor 12, a tether 14, and a base 16, as shown in the embodiment of FIGS. 2-4. The sensor 12 is configured to be secured to the consumer product M, such as with a pressure-sensitive adhesive. Alternatively, or in addition, the sensor 12 may be secured to the consumer product M by one or more retaining or bracket arms 34, as illustrated in the embodiment of FIG. 1. As explained in further detail below, the security system 10 includes alarming circuitry configured to monitor and detect various security events, such as a cutting, severing, removing or detaching of the tether 14 and/or removal of the consumer product from the sensor 12. As also explained in further detail below, the tether 14 may consist of only a pair of conductors 50. Thus, unlike conventional tethers that include three, four, or more conductors, the tether 14 according to one embodiment may have only two conductors 50 for providing power and additional functionality.

A first end of the tether 14 may be electrically connected to a recoiler 18, as shown in FIG. 4, while the opposite second end of the tether may include a jack or connector 22 for electrically connecting the tether to the sensor 12, as shown in FIG. 2. Thus, connector 22 may be releasably engaged with sensor 12 to establish electrical communication therebetween. The connector 22 may be further secured in position with a lock mechanism 21, such as a clip, as indicated by the arrow in FIG. 2. As such, when the lock mechanism 21 is engaged with connector 22, the connector may not be removed from the sensor 12 without first unlocking the lock mechanism, such as using a key. The lock mechanism 21 may allow tension to be applied to the tether 14 without causing the connector 22 to become inadvertently disconnected from the sensor 12. Furthermore, the lock mechanism 21 may allow the sensor 12 to be readily removed from the tether 14 for remerchandising different consumer products M.

Figure 7:
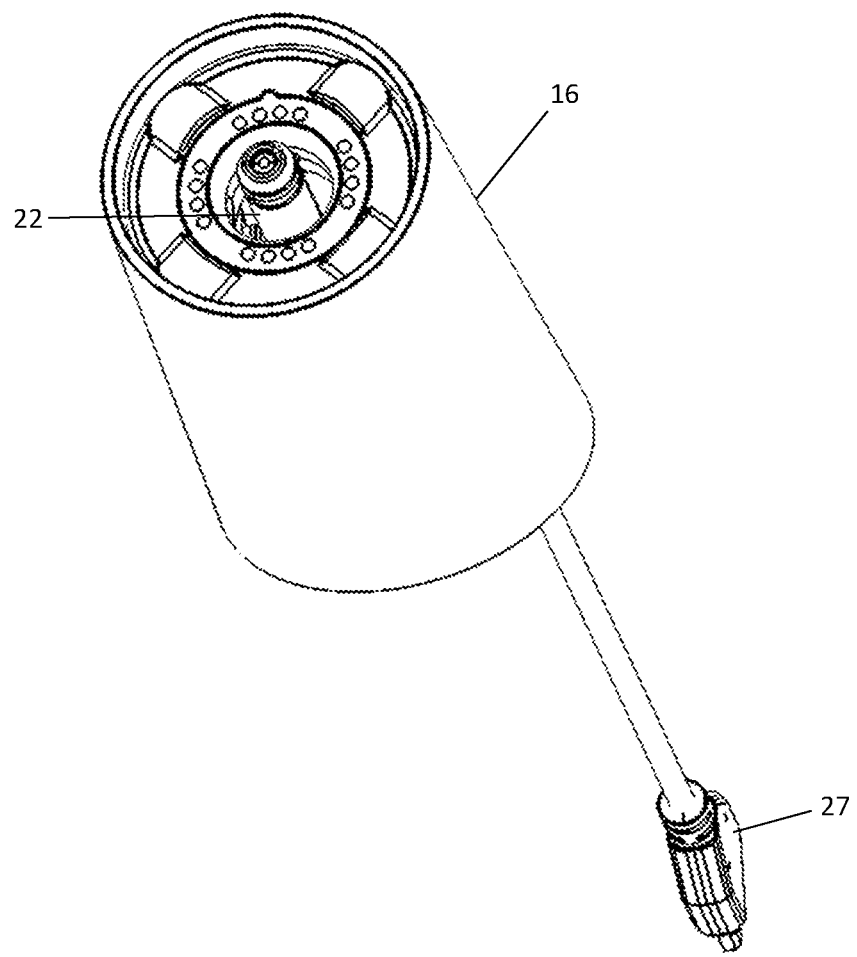
FIG. 7 is a perspective view of a base of a merchandise security system for displaying and protecting an article of merchandise according to an embodiment of the invention.

The base 16 is configured to removably support the sensor 12 thereon such that a prospective purchaser may remove the consumer product M and the sensor secured thereto from the base for inspection, and subsequently return the merchandise to the base for display. The base 16 may define an opening 15 therethrough that allows the tether 14 to extend and retract relative to the base. Recoiler 18 may be disposed within the base 16 (see, e.g., FIGS. 7-8), or alternatively, the recoiler may be secured below a support surface 20 (e.g., a counter, shelf, or the like) of a display fixture (see, e.g., FIG. 3). In the latter instance, the recoiler 18 may include a mounting plate 23 that is configured to be secured to the underside of the support surface 20, in which case the recoiler is configured to engage the mounting plate and be secured thereto. The base 16 may be attached to the support surface 20 with fasteners and/or adhesive. According to one embodiment, the base 16 may include a contact, limit or pressure switch or the like, that is configured to detect when the base has been removed from the support surface 20. The alarming circuitry may be configured to detect the removal of the base 16 from the support surface 20 and to generate and an audible and/or a visual alarm signal in response thereto.

As shown in FIG. 3, the recoiler 18 may be electrically connected to a power source 24 via an input power cable 25 that is configured to provide power to the recoiler and to the tether 14. A plug or other connector, for example, an AC power plug and AC/DC power converter, may be disposed at a first end of the input power cable 25 for electrically connecting the input power cable to an external source of electrical power, for example, a conventional 110V AC power outlet. A second opposite end of the input power cable 25 may be electrically connected to an input cable 27 of the recoiler 18. In some embodiments, the sensor 12 is also electrically connected to a power cable 26 that is configured to provide electrical power to the consumer product M, as shown in FIG. 2. Thus, the power cable 26 may be utilized to facilitate demonstration of the operation of the consumer product M on display, as well as for charging a rechargeable battery of the merchandise. FIG. 2 further shows that the power cable 26 may include a connector 28 that is configured to operably engage an input port provided on the consumer product M. In some embodiments, the alarming circuitry of the sensor 12 and/or the base 16 may be configured to detect removal of the connector 28 and to generate an audible and/or a visual alarm signal in response to removal of the connector 28 from the sensor 12. Of course, in some embodiments, a recoiler 18 may be optional, and the tether 14 may simply be electrically connected between the sensor 12 and the base 16 (e.g., with an extensible tether).

In some embodiments, the sensor 12 may include alarming circuitry (e.g., a processor, a central processing unit, or the like) that is configured to determine whether various security events have occurred for generating an audible and/or a visual alarm signal. The sensor 12 may also include an alarm (e.g., a piezoelectric device) that is configured to generate an audible alarm. Thus, the sensor 12 may be configured as "alarm-on-product," whereby the sensor is operable to alarm when attached to the consumer product M and/or when detached from the consumer product. In some cases, the sensor 12 may include a visual indicator (e.g., an LED) for indicating the alarming circuitry is armed and/or alarming. Moreover, the sensor 12 may include a transfer port 30 for facilitating communication with a key 32 (see, FIG. 5) for arming and/or disarming the alarming circuitry. In one embodiment, the transfer port 30 is configured to facilitate wireless communication with key 32 to determine whether the key is authorized to arm and/or disarm the alarming circuitry. According to some embodiments, the key 32 is similar to that described in U.S. Pat. No. 7,737,845, the contents of which are hereby incorporated by reference in their entirety. According to one embodiment, the sensor 12 may include a contact, limit or pressure switch, or the like, that is configured to detect when the consumer product M has been removed from the sensor. The alarming circuitry may be configured to detect the removal of the consumer product M from the sensor 12 and to generate and an audible and/or a visual alarm signal in response thereto.

In one embodiment, the base 16 may also or alternatively include alarming circuitry that is configured to determine whether various security events have occurred for generating an audible and/or a visual alarm signal. The base 16 may also include an alarm (e.g., a piezoelectric device) that is configured to generate an audible alarm. In some cases, the base 16 may include a visual indicator (e.g., an LED) for indicating the alarming circuitry is armed and/or alarming. Moreover, the base 16 may include a transfer port 30 or like means for facilitating communication with key 32 for arming and/or disarming the alarming circuitry.

Figure 8:
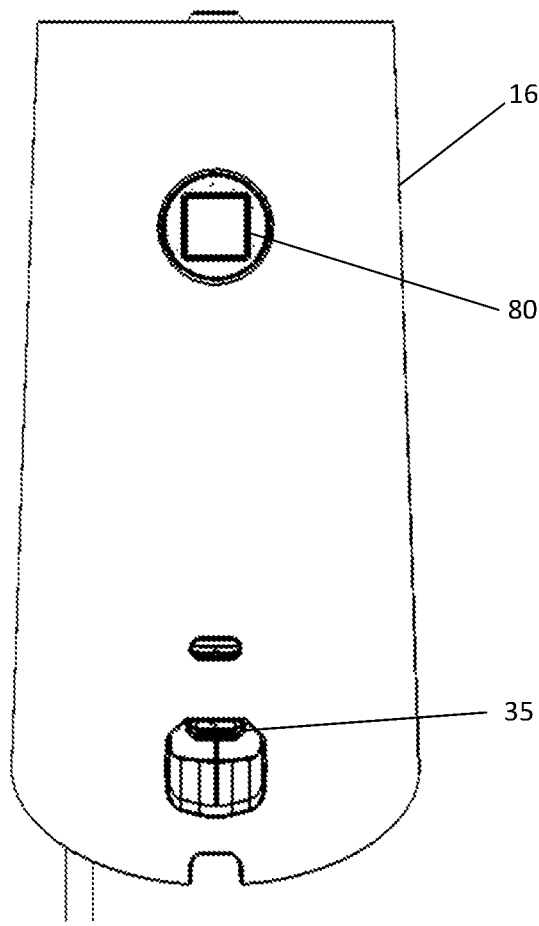
FIG. 8 is a rear view of the base shown in FIG. 7.
Figure 9:
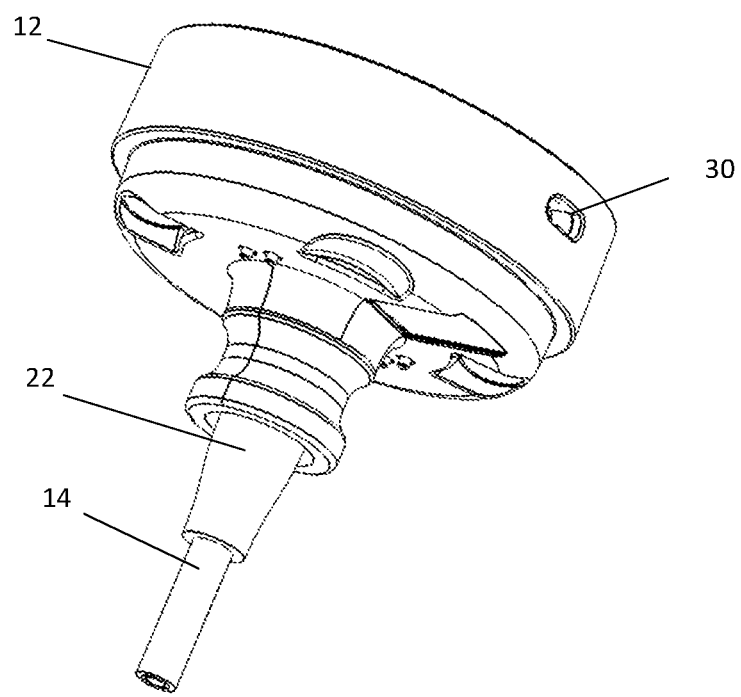
FIG. 9 is a perspective view of a sensor of a merchandise security system for displaying and protecting an article of merchandise according to an embodiment of the invention.

Furthermore, the base 16 may include one or more auxiliary ports 35 for connecting to corresponding auxiliary devices for the item of merchandise (see, e.g., FIG. 8). Thus, in addition to securing a consumer product M and electrically connecting to an input cable 27 and associated input power source 24, the base 16 may be configured to electrically connect to an auxiliary device, such as, for example, an auxiliary device for the consumer product on display (e.g., a stylus, speaker, keyboard, Bluetooth device, etc.). The auxiliary port 35 may be an input port (e.g., a micro-USB port) that is configured to receive a corresponding input connector of a sensor cable that is electrically connected to the auxiliary device. The auxiliary port 35 may be integrated into the base 16 such that the auxiliary port is defined in an outer surface of the base. When the input connector is connected to the auxiliary port 35, the auxiliary port may be configured to receive power, if necessary, and/or define a sense loop that may be used to detect various security events associated with the auxiliary device, such as the input connector being removed from the base 16 in an unauthorized manner. The auxiliary port 35 may be part of the same sense loop defined with the sensor 12 and the tether 14, or may define a separate sense loop. In the instance where the auxiliary port 35 is configured to provide power, the base 16 may be configured to determine the power requirements of the auxiliary device and provide the necessary power level to effectuate charging. In some cases, the base 16 may be configured to reduce the amount of power being provided to the sensor 12 and/or the consumer product M so that power may be provided to the auxiliary device while still facilitating charging of the sensor and/or the item of merchandise. Therefore, the auxiliary port 35 allows an auxiliary device to be displayed and used by a prospective consumer in connection with a consumer product M, while the retailer is able to also power and protect both the product and the auxiliary device from theft with a single sensor 12 and base 16 device rather than requiring two separate sensors and bases.

In another embodiment, a locking feature may be provided for locking the sensor 12 to the base 16. In this regard and with reference to FIG. 8, a lock mechanism 80 may be configured to lock the sensor 12 to the base 16 when the sensor is seated on the base to thereby prevent the tether 14 from being retracted relative to the base. Such a lock mechanism 80 may be useful for retailers who wish to secure the sensor 12 and consumer product M to the base 16, such as after hours, since the tether 14 will be inaccessible due to the inability to lift the sensor from the base. In the illustrated embodiment, the lock mechanism 80 includes a locking member that is configured to rotate between locked and unlocked positions. In this instance, the locking member 82 may be actuated using a proprietary key, which could be the same key 32 that is used to actuate the lock mechanism 21. In some embodiments, the lock mechanism 80 is similar to that disclosed in U.S. Application No. 62/613,622, entitled Systems and Methods for Locking a Sensor to a Base, filed on Jan. 4, 2018, and International Publication No. 2018/222674, entitled Systems and Methods for Locking a Sensor to a Base, filed on May 30, 2018, the entire contents of which are incorporated herein by reference.

It is understood that the tether 14 may be any suitable cord, cable, or the like. In addition, the tether 14 may include one or more electrical conductors 50 for transmitting various electrical signals, such as power, security, and/or data signals. In addition, the tether 14 be a single strand, multi-strand, or braided. The tether 14 may be flexible to facilitate extension and retraction relative to the base 16, and in some embodiments, may be formed of a cut-resistant material. Furthermore, the tether 14 may have various cross sections, such as round or flat. As described in further detail below, the tether 14 may have a pair of conductors 50 for defining a sense loop and/or for transferring power and/or data.

Figure 6:
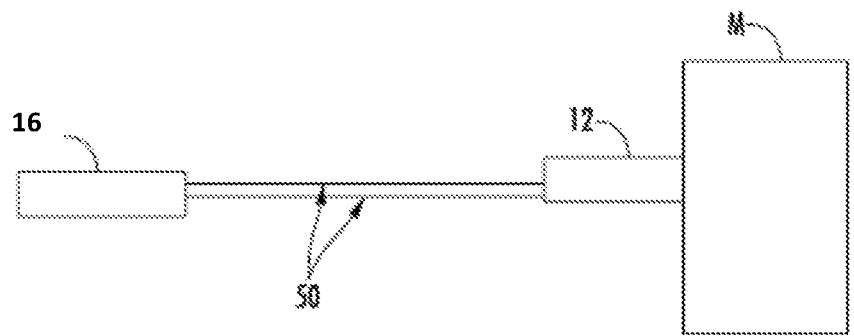
FIG. 6 is a schematic illustrating a pair of conductors configured for transmitting electrical power to the sensor and/or the article of merchandise according to the invention.

In some embodiments, the sensor 12 and the base 16 may be electrically connected to one another and be configured to communicate with one another using the conductors 50 in the tether 14. Embodiments of the present invention provide for the delivery of electrical power to the consumer product M and/or to the sensor 12 through a pair of conductors 50 (see, e.g., FIG. 6) disposed within the tether 14 (removed for purposes of clarity). In some examples, the tether 14 includes only two conductors 50, such as a positive power line and a ground line. An input power source 24 may be in electrical communication with the conductors 50 for transmitting power through the tether 14 and to the consumer product M and/or the sensor 12. In order to obtain a sense signal using only the power lines, one technique is to simply detect when the electrical power stops flowing. The problem with this method is that the sensor 12 and/or the consumer product M typically do not receive power when there is a power outage, which could cause a false alarm in the merchandise security system 10. Instead, one embodiment of the invention provides security sensing over the same conductors 50 used to supply power to the consumer product M and/or the sensor 12. As such, the diameter of the tether 14 may be reduced in comparison to conventional tethers that require additional conductors for a sense signal, and the incidence of false alarms may also be reduced.

As discussed above, the tether 14 may include conductors 50 for transferring various electrical signals. In one example, the tether 14 includes a pair of conductors 50 for transmitting a plurality of electrical signals, including power, security, and data signals. Thus, despite the additional functionality beyond simply providing power which requires two conductors, the diameter of the tether 14 may remain the same whereas conventional tethers would require more than two conductors in order to transmit additional electrical signals. In order to accomplish this in one embodiment, the security system 10 utilizes communication over power techniques. For example, power-line communication (PLC) may be used whereby electrical signals are transmitted on the conductors 50. Thus, in some instances, power is able to be continuously transferred to the sensor 12 and/or the consumer product M at the same time other electrical signals are being transferred over the same two conductors 50. Similarly, electrical signals are able to be transferred using the conductors 50 even when power is not being provided. This is unlike conventional PLC where electrical signals are superimposed on the power signal itself. As such, in one embodiment, even when power is not being transferred, electrical signals are able to be transmitted using the pair of conductors 50. The ability to transmit electrical signals while power is not transmitted may reduce false alarms since the alarming circuitry will be able to determine whether a power loss is due to the tether 14 being cut or disconnected rather than a failure due to a power outage. The sensor 12 and/or the base 16 may include a power source to facilitate the transmission of electrical signals in the event of a power outage.

Various types of data signals may be transmitted using the pair of conductors 50, such as for example, the make, model, and/or serial number of the consumer product, the number of "pulls" or "pickups" of a particular consumer product relative to the base 16, the location of the consumer product, the status of the security system (e.g., armed or alarming), an identity of the security system (e.g., a sensor ID or base ID), the power status of the consumer product, retail store information and location, the occurrence and time of a power loss to the security system 10, an identifier of a key 32 that interacts with the security system 10, the number and time of interactions with a key, the occurrence of a security event, etc. Thus, different types of data signals regarding the consumer product, interaction with the consumer product, and status of the security system 10 may be transmitted using the pair of conductors 50. Moreover, the sensor 12 and the base 16 may communicate with one another by sending electrical signals using the pair of conductors 50, such as an electrical signal instructing the sensor or the base to generate an alarm signal. Security signals may also be transmitted using the same pair of conductors whereby the pair of conductors define a sense loop through the tether 14, including the embodiment where a sense loop is also defined with the auxiliary port 35. Should the sense loop be interrupted, such as by cutting or disconnecting the tether 14, disconnecting the auxiliary device, or detaching the consumer product M, the sensor 12 and/or the base 16 may generate an alarm signal.

In another embodiment, a plurality of security systems 10 may be configured to communicate with one another. For example, the security systems 10 may belong to a network linked by the same electrical circuit associated with the same external power source electrically connected to each of the security systems. Such communication may occur in a similar manner as discussed above using PLC. The security systems 10 may be configured to transmit various types of data, such as those examples discussed above. Moreover, in another example, one security system 10 experiencing an alarm event may be configured to send a notification to each of the other security systems in the network so that the other security systems may generate an alarm signal.

The foregoing has described one or more embodiments of security systems and methods for displaying and protecting a consumer product from theft. Those of ordinary skill in the art will understand and appreciate that numerous variations and modifications of the invention may be made without departing from the spirit and broad scope of the invention. Accordingly, all such variations and modifications are intended to be encompassed by the appended claims.

That which is claimed is:

1. A merchandise security system for displaying and protecting a consumer product from theft, the merchandise security system comprising:
    a sensor configured to be secured to the consumer product;
    a base configured to removably support the sensor;
    alarming circuitry; and
    a tether comprising a pair of conductors electrically connected to the alarming circuitry, the tether configured to be connected to the sensor, and the base configured to receive the tether,
    wherein the tether consists of only the pair of conductors for transmitting power and a plurality of electrical signals between the base and the sensor using the pair of conductors, wherein the plurality of electrical signals comprise security signals and data signals,
    wherein the pair of conductors is configured to transmit the plurality of electrical signals between the base and the sensor using the pair of conductors while power is not being transmitted using the pair of conductors,
    wherein the alarming circuitry is configured to monitor at least one of the plurality of electrical signals transmitted by the pair of conductors in order to determine whether the tether has been cut or removed from the sensor.

2. The merchandise system of claim 1, wherein the pair of conductors comprises a positive power conductor and a ground conductor.

3. The merchandise system of claim 1, wherein the tether is coupled to a recoiler such that the tether is extendable and retractable relative to the recoiler.

4. The merchandise system of claim 3, wherein the recoiler is housed within the base.

5. The merchandise system of claim 1, wherein an end of the tether comprises a connector configured to releasably engage the sensor.

6. The merchandise system of claim 1, wherein the sensor and/or the base is configured to generate a visual and/or an audible alarm signal in response to the sensor being removed from the consumer product, the tether being disconnected from the sensor, and/or the tether being cut.

7. The merchandise system of claim 6, wherein the sensor and the base are configured to communicate with one another using the pair of conductors to determine whether to generate the visual and/or the audible alarm signal.

8. The merchandise system of claim 1, wherein the pair of conductors is configured to transmit the power and the plurality of electrical signals between the base and the sensor using power-line communication.

9. The merchandise system of claim 1, wherein the alarming circuitry is carried by the sensor.

10. The merchandise system of claim 1, wherein the alarming circuitry is carried by the base.

11. The merchandise system of claim 1, wherein each of the sensor and the base comprises alarming circuitry.

12. The merchandise system of claim 1, wherein the base comprises an auxiliary port configured to operably connect to an auxiliary device of the consumer product.

13. The merchandise system of claim 12, wherein the pair of conductors is configured to transmit data regarding the auxiliary port.

14. The merchandise system of claim 1, wherein the data signals comprise data regarding the consumer product, interaction with the consumer product, and a status of the security system.

15. The merchandise system of claim 1, wherein the data signals comprise an identification and a status of the security system.

16. The merchandise system of claim 1, wherein the data signals comprise an identification of the consumer product.

17. The merchandise system of claim 1, wherein the data signals comprise a location of the consumer product.

18. The merchandise system of claim 1, wherein the data signals comprise a status of the consumer product.

19. A method for displaying and protecting a consumer product from theft, the method comprising:
    transferring power to a sensor attached to the consumer product and/or to the consumer product with a tether connected to the sensor, the tether consisting of a pair of conductors for transmitting the power; and
    transmitting a plurality of electrical signals using the pair of conductors, wherein the plurality of electrical signals comprise security signals and data signals, wherein transmitting comprises transmitting the plurality of electrical signals between the base and the sensor using the pair of conductors while power is not being transmitted using the pair of conductors; and
    monitoring at least one of the plurality of electrical signals in order to determine whether the tether has been cut or disconnected from the sensor.

20. A merchandise security system for displaying and protecting consumer products from theft, the merchandise security system comprising:
    a plurality of security systems, each security system comprising:
        a sensor configured to be secured to a consumer product;
        a base configured to removably support the sensor;
        alarming circuitry; and
        a tether comprising a pair of conductors electrically connected to the alarming circuitry, the tether configured to be connected to the sensor, and the base configured to receive the tether,
    wherein each tether consists of only the pair of conductors for transmitting power and a plurality of electrical signals between a respective base and sensor using the pair of conductors, wherein the pair of conductors is configured to transmit the plurality of electrical signals between the respective base and the sensor using the pair of conductors while power is not being transmitted using the pair of conductors, wherein the alarming circuitry of each sensor or base is configured to monitor at least one of the plurality of electrical signals transmitted by the pair of conductors in order to determine whether a respective tether has been cut or removed from the sensor, and wherein each of the security systems is arranged in a network for communicating data signals with one another, the data signals comprising an identification and a status of each of the plurality of security systems and a status of the consumer product secured to each sensor, the network defined by an electrical circuit associated with an external power source configured to provide power to each of the plurality of security systems.

* * * * *